(12) United States Patent
Cheng

(10) Patent No.: US 7,466,458 B2
(45) Date of Patent: Dec. 16, 2008

(54) CALIBRATION MECHANISM OF A SCANNING DEVICE

(75) Inventor: Sung-Po Cheng, Hsinchu (TW)

(73) Assignee: Avision Inc. (TW)

( * ) Notice: Subject to any disclaimer, the term of this patent is extended or adjusted under 35 U.S.C. 154(b) by 123 days.

(21) Appl. No.: 11/518,703

(22) Filed: Sep. 11, 2006

(65) Prior Publication Data

US 2007/0070457 A1     Mar. 29, 2007

(30) Foreign Application Priority Data

Sep. 12, 2005   (TW) ............................... 94131251 A

(51) Int. Cl.
  *H04N 1/40*     (2006.01)
  *H04N 1/04*     (2006.01)

(52) U.S. Cl. ....................... 358/461; 358/406; 358/496; 358/498

(58) Field of Classification Search .................. 358/461, 358/406, 504, 496, 498; 382/274; 399/367, 399/374
See application file for complete search history.

(56) References Cited

U.S. PATENT DOCUMENTS

| 6,947,187 | B2 * | 9/2005 | Mui et al. | 358/496 |
| 7,236,274 | B2 * | 6/2007 | Sheng et al. | 358/504 |
| 2005/0248814 | A1 * | 11/2005 | Yang | 358/498 |

* cited by examiner

*Primary Examiner*—Cheukfan Lee

(57) ABSTRACT

A calibration mechanism of a scanning device including an assembly of a flexible member and a calibration strip and a limiting member is disclosed. The assembly of the flexible member and the calibration strip can travel in reciprocating motion, and the limiting member limits the distance of the vertical drift of the calibration strip. Thus, the calibration strip is confined within an anticipated position, and the accuracy and the consistency of the calibration results for an optical module of the scanner, which acquires image data of a plurality of the-scanning lines of the calibration strip, are greatly improved.

6 Claims, 5 Drawing Sheets

CALIBRATION MECHANISM OF A SCANNING DEVICE

BACKGROUND OF THE INVENTION

1. Field of the Invention

The present invention relates to a calibration mechanism, and more particularly to a calibration mechanism of a scanner. The calibration mechanism is disposed in the scanner, and a calibration strip, which travels in reciprocating motion relative to an optical module of the scanner, is disposed in the calibration mechanism. Therefore, image data of a plurality of scanning lines are acquired by the optical module as a light illuminates on the moving calibration strip, and the image data of the scanning lines becomes parameters for the scanner to calibrate the shading of the optical module.

2. Prior Art

Generally, there are two different types of dynamic calibration mechanism for a scanner: one is a stationary calibration strip mounted in a flatbed scanner, such that an optical module of the scanner moves relative to the stationary calibration strip to acquire the image data of the calibration strip; and the other is a movable calibration strip mounted in a feeder or in a scanner with an auto document feeder, such that the movable calibration strip moves relative to an optical module of the feeder.

Referring to FIG. 1, for a dynamic calibration mechanism, a calibration strip 11 is mounted at one end of a flexible member 13, and a roller 15 is connected with the other end of the flexible member 13. By the rotation of the roller 15, the assembly of the flexible member 13 and the calibration strip 11 moves relative to an optical module 17 of the scanner in reciprocal motion. A light source (not shown) illuminates on the moving calibration strip 11, and as the light reflected from the calibration strip 11 is received by the optical module 17, image data of a plurality of scanned lines of the calibration strip 11 is obtained, so as to use the image data as parameters for calibrating the shading of image sensors of the optical module.

Because vertical movement of the flexible member 13 and the calibration strip 11 is not restricted, a vertical drift easily occurs to the calibration strip 11, where the calibration strip 11 moves up and down (shown as dotted line). Thus, as the optical module 17 operates to perform the calibration, different results will be obtained because the vertical position of the calibration strip 11 is not constant.

In order to keep the calibration results correct and consistent, the vertical movement of the calibration strip 11 has to be confined within a certain range when the optical module operates to correct the shading of the image sensors.

SUMMARY OF THE INVENTION

It is, therefore, an objective of the present invention to provide a calibration mechanism of a scanner, in which a calibration strip is moved relative to an optical module, so that the optical module can obtain image data of scanning lines of the calibration strip for performing the shading correction of image sensors of the optical module.

Another objective of the invention is to provide a calibration mechanism of a scanner, in which the calibration strip is confined within a certain range, and a vertical drift of the calibration strip, as in the prior art, does not occur while the optical module scans the calibration strip. Therefore, the distance between the calibration strip and the optical module of the scanner can remain constant, and the optical module operating to calibrate the shading of the image sensors can get a correct and consistent calibration result each time.

The invention achieves the above-identified objective by providing a calibration mechanism that includes a flexible member, a calibration strip, and a limiting member. The calibration strip is attached to one end of the flexible member, and the other end of the flexible member is attached to a roller. When the roller turns, the calibration strip and the flexible member can move in reciprocating motion. A light beam of a light source will then illuminate on the moving calibration strip, and the optical module will be able to obtain image data of a plurality of scanning lines from the moving calibration strip for calibrating the shading of the scanner.

The limiting member is mounted on the moving path of the calibration strip. Therefore, when the calibration strip moves to a certain position, the vertical movement of the calibration strip is restricted by the limiting member so as to reduce the chance of vertical drift occurring. Because the distance between the calibration strip and the optical module is maintained at a constant length, the optical module can obtain image data of the scanned lines as calibration parameters to calibrate the shading of the scanner.

DETAILED DESCRIPTION OF THE PREFERRED EMBODIMENT OF THE INVENTION

Figure 1:
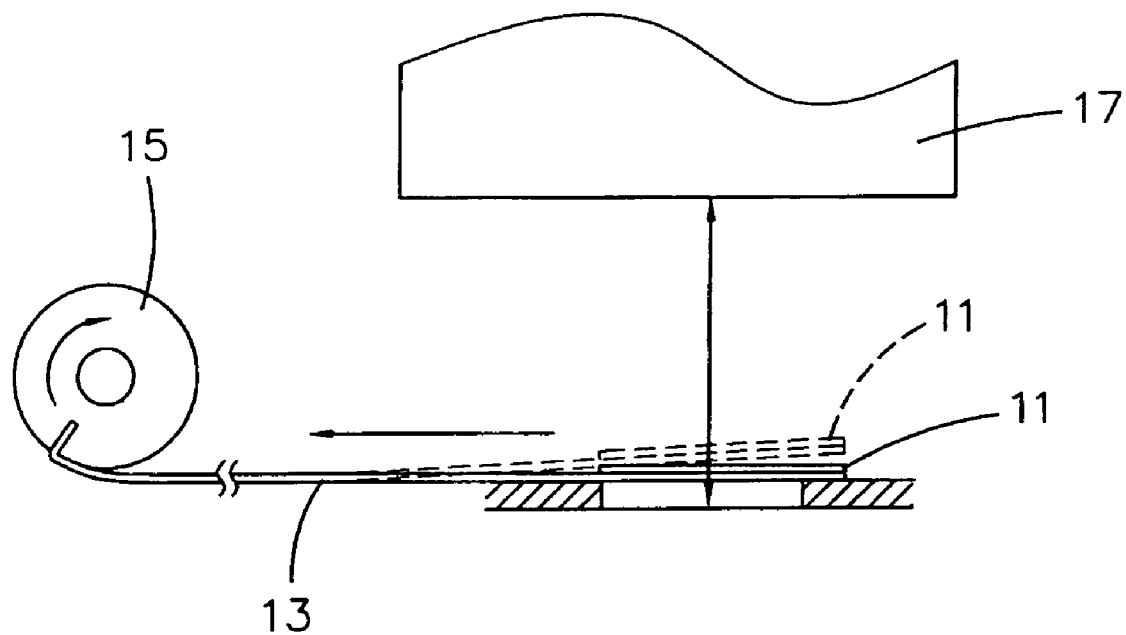
FIG. 1 is a schematic illustration showing a calibration mechanism of the prior art.
Figure 2:
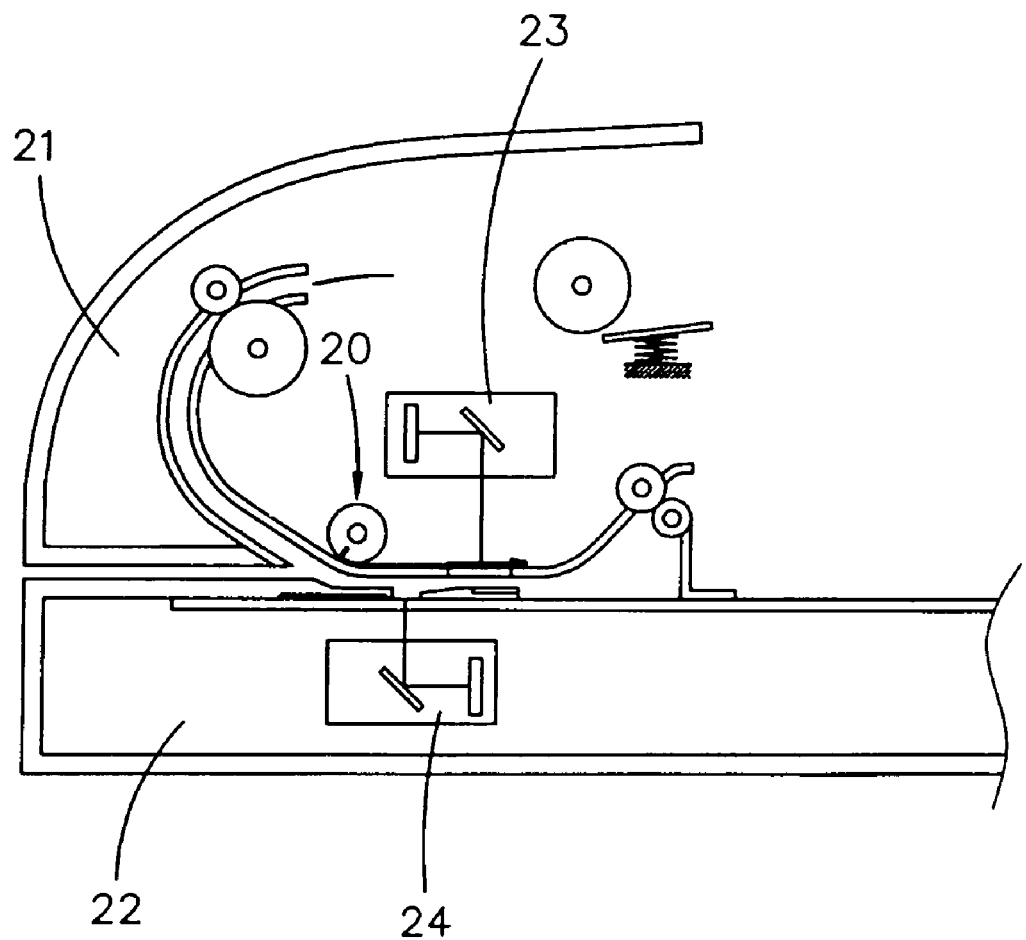
FIG. 2 is a schematic illustration showing a flatbed scanner, which includes the calibration mechanism of the invention, equipped with a sheet feeder.

Referring to FIG. 2, a movable calibration mechanism 20 is mounted in a sheet feeder 21. The sheet feeder 21 is disposed on a flatbed scanner 22, and the sheet feeder 21 is assembled with an optical module 23 disposed in the interior. Thus, the optical module 23 of the sheet feeder 21 and an optical module 24 of the flatbed scanner 22 can scan both sides of a document at the same time. When the optical module 23 operates to scan, the optical module 23 and the calibration mechanism 20 cooperate to perform the shading correction.

Figure 3:
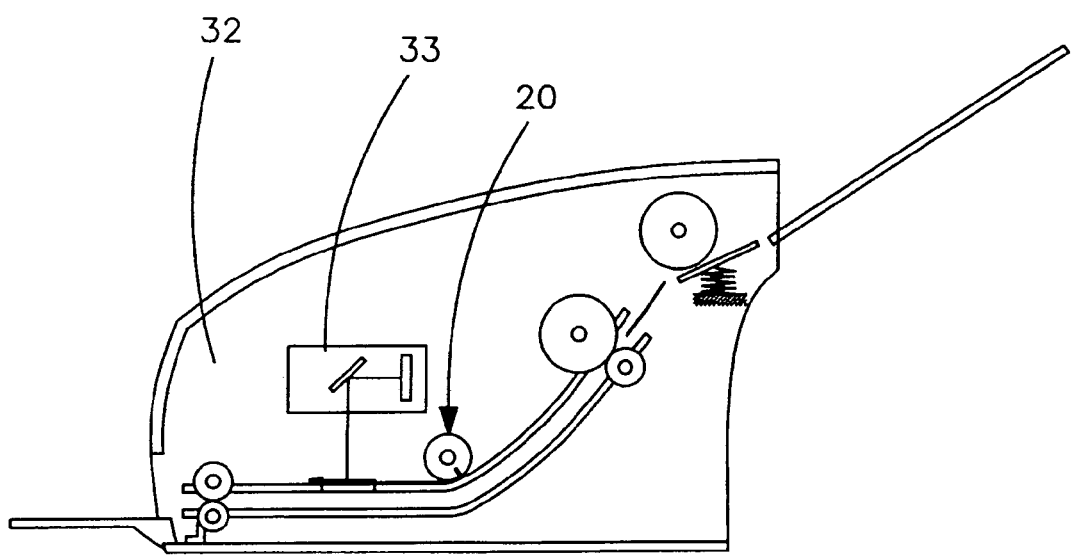
FIG. 3 is a schematic illustration showing a sheet-fed scanner equipped with the calibration mechanism of the invention.

Referring to FIG. 3, the movable calibration mechanism 20 can also be mounted in a sheet-fed scanner 32. An optical module 33 is disposed in the sheet-fed scanner 32 for scanning a document. When the optical module 33 operates to scan, the optical module 33 and the calibration mechanism 20 cooperate to perform the shading correction.

Figure 4:
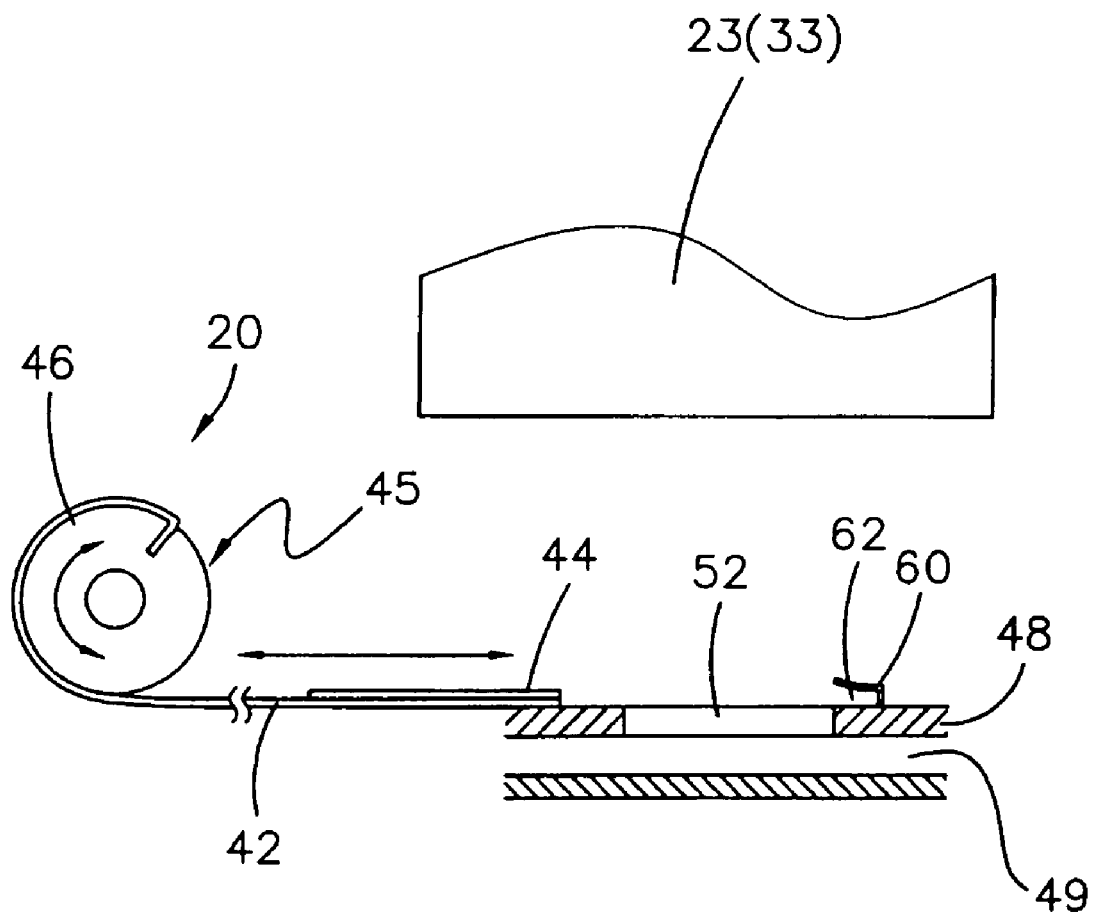
FIG. 4 is a schematic illustration showing the calibration mechanism of the invention.

Referring to FIG. 4, the calibration mechanism 20 includes a flexible member 42, a calibration strip 44, and a driving device 45. The calibration strip 44 is a single color sheet such as white, or the calibration strip 44 can be a sheet with multi-grayscale. The calibration strip 44 is mounted at one end of the flexible member 42, and a roller 46 of the driving device 45 is combined with the other end of the flexible member 42. The roller 46 is driven by a power source (not shown) of the driving device 45, and the roller 46 is able to turn in clockwise or counter-clockwise direction. Thus, the flexible member 42 and the calibration strip 44 are moved in reciprocating motion by the roller 46 changing the rotational direction.

The flexible member 42 and the calibration strip 44 rest on a surface 48. The surface 48, for example, is a wall of a feeding passageway 49 of the scanner. A scanning window 52 is formed as a part of the surface 48, and the optical module 23 or 33 is disposed opposite the scanning window 52. That is to say, the optical module 23 or 33 and the calibration mechanism 20 are disposed in the scanner near the feeding passageway 49.

When a document (not shown) moves across the scanning window 52, the optical module 23 or 33 can obtain a scanning image of the document.

When the calibration strip 44 moves across the scanning window 52, the optical module 23 or 33, though stationary, obtains image data of a plurality of scanning lines at the different positions of the moving calibration strip 44. The image data of the scanning lines can be used as the calibration parameters to calibrate the shading of the optical module 23 or 33.

Furthermore, a limiting member 60 is mounted on the surface 48 and aligned with the moving path of the calibration strip 44. The limiting member 60 is used to limit the vertical movement of the calibration strip 44. Thus, the calibration strip 44 has no vertical drift relative to the surface 48 when the calibration strip 44 contacts with the limiting member 60. The limiting member 60 can be an elastic member with bending structure. One end of the limiting member 60 is fastened on the surface 48, and the other end of the limiting member 60, which is a free end and hung parallel to the surface 48, is opposite to the surface 48. A gap 62 is formed between the surface 48 and the free end of the limiting member 60, and the height of the gap 62 is substantially equal to the assembly thickness of the calibration strip 44 and the flexible member 42.

Figure 5:
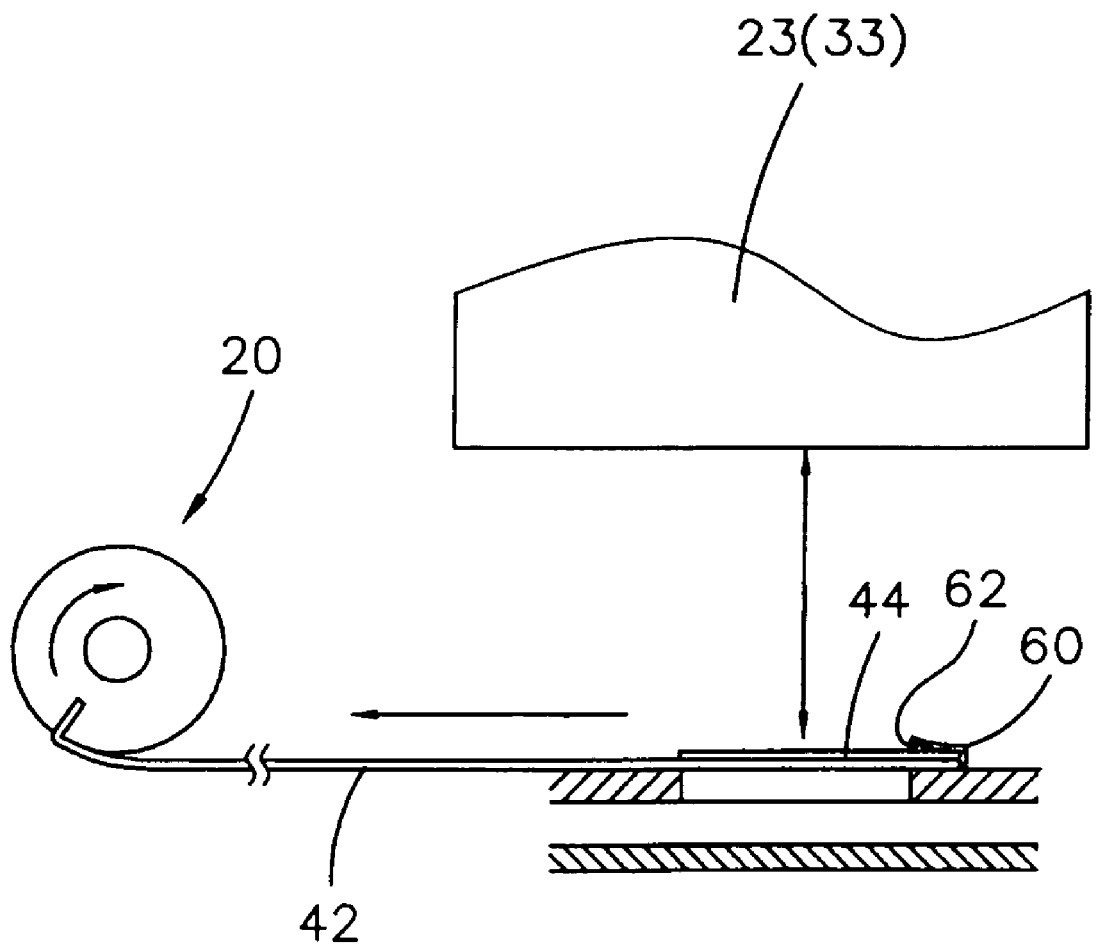
FIG. 5 is a schematic illustration showing a usage state of the invention.

Referring to FIG. 5, when the calibration strip 44 moves forward to and contacts with the limiting member 60, one end of the assembly of the calibration strip 44 and the flexible member 42 is moved into the gap 62. Because the height of the gap 62 is equal to the assembly thickness of the calibration strip 44 and the flexible member 42, the calibration strip 44 is suppressed by the limiting member 60 and will not be able to move forward to the optical module 23 or 33.

Because a position drift will not occur, as the calibration strip 44 moves across the scanning window 52, the distance between the calibration strip 44 and the optical module 23 or 33 remains constant. The calibration strip 44 moves steadily without vertical drift occurring, so the optical module 23 or 33 can receive steady light signals of the scanning lines of the calibration strip 44 each time. Thus, the calibrating result of the optical module 23 or 33 obviously increases in accuracy and steadiness.

The invention has the following advantages which can be understood by the aforesaid description.

1. The optical module can obtain a plurality of different scanning lines at the different positions of the moving calibration strip due to the fact that the calibration strip makes a linear motion, and the optical module is fastened. Thus, even if the calibration strip has a black mark, or other factors cause a scanning line not able to provide the desired calibration effect to the optical module, the optical module can still perform the calibration by using other scanning lines as parameters.

2. Due to the fact that the limiting member restricts the vertical position of the calibration strip, the vertical drift mentioned in the prior art will not occur, and the moving path of the calibration strip will be sticking close to the anticipated path. Therefore, the results of the calibration by the optical module will be more accurate and consistent.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A calibration mechanism for calibrating the shading of an optical module, wherein the calibration mechanism and the optical module are disposed in a scanning device and near a feeding passageway of the scanning device, the optical module scans a calibration strip of the calibration mechanism to obtain data of scanning lines to calibrate the shading of the optical module, said calibration mechanism comprising:
   a driving device disposed in the scanning device;
   a flexible member having two ends, one end connected with the driving device and the other end attached to the calibration strip; and
   a limiting member mounted in the scanning device and aligned with a moving direction of the calibration strip; wherein the flexible member is driven by the driving device such that the calibration strip reciprocates along a linear direction, the calibration strip is suppressed by the limiting member, and a vertical drift does not occur.

2. A calibration mechanism according to claim 1, wherein the driving device includes a roller and a power source, the roller is connected with the one end of said flexible member, and the power source is used to drive the roller and change a rotation direction of the roller.

3. A calibration mechanism according to claim 1, wherein the limiting member is an elastic member, one end of the elastic member is mounted on a surface of a wall forming the feeding passageway, and the other end of the elastic member is a free end, so that a gap is formed between the surface and the free end of the elastic member.

4. A calibration mechanism according to claim 3, wherein the height of the gap is substantially equal to the thickness of the calibration strip and the flexible member.

5. A calibration mechanism according to claim 1, wherein the scanning device is a flatbed scanner combined with a feeder.

6. A calibration mechanism according to claim 1, wherein the scanning device is a sheet-fed scanner.

* * * * *